United States Patent
Nakanishi et al.

(10) Patent No.: US 6,535,692 B2
(45) Date of Patent: Mar. 18, 2003

(54) CAMERA WITH BUILT-IN ELECTRONIC FLASH AND ELECTRONIC FLASH DEVICE

(75) Inventors: Hiromi Nakanishi, Hino (JP); Takao Hosaka, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/871,530

(22) Filed: May 31, 2001

(65) Prior Publication Data

US 2002/0001466 A1 Jan. 3, 2002

(30) Foreign Application Priority Data

Jun. 5, 2000 (JP) ........................... 2000-167446
Jun. 5, 2000 (JP) ........................... 2000-167447

(51) Int. Cl.$^7$ ............................................. G03B 15/03
(52) U.S. Cl. ........................................ 396/159; 396/161
(58) Field of Search ........................... 396/6, 159, 161, 396/176, 458

(56) References Cited

U.S. PATENT DOCUMENTS

| | | |
|---|---|---|
| 4,163,181 A | 7/1979 | Farber |
| 5,119,262 A | 6/1992 | Ikeuchi |
| 5,587,644 A * | 12/1996 | Masaki ........................ 320/166 |

FOREIGN PATENT DOCUMENTS

| | | |
|---|---|---|
| EP | 0999467 | 5/2000 |
| GB | 376235 | 1/1972 |

OTHER PUBLICATIONS

European Search Report EP 01 11 3388.

* cited by examiner

*Primary Examiner*—Russell Adams
*Assistant Examiner*—Arthur A Smith
(74) *Attorney, Agent, or Firm*—Muserlian, Lucas and Mercanti

(57) ABSTRACT

A camera with a built-in electronic flash device, includes: a photographing lens; an aperture stop; an electronic flash emitting portion; a light receiving element for receiving light reflected on a photographic object which has been emitted by the flash emitting portion; and an electronic flash circuit for making the flash emitting portion emit light, the flash circuit having an automatic emission control circuit which stops emission of the flash emitting portion when an amount of the reflected light received by the light receiving element reaches a specified value. With respect to the automatic emission control circuit, A min satisfies the following conditional expression, $(A-1)\ EV \leq A\ min \leq (A+0.5)\ EV$, where A min represents a minimum exposure value for a recording medium on which a specified photographic object is recorded when the photographic object that is located at a distance falling within a range from a specified shortest distance to a distance determined by both a guide number obtained when the flash emitting portion emits light at full emission and the aperture stop, is photographed, and A represents a theoretical exposure value.

15 Claims, 5 Drawing Sheets

0°C
25°C

CAMERA WITH BUILT-IN ELECTRONIC FLASH AND ELECTRONIC FLASH DEVICE

BACKGROUND OF THE INVENTION

This invention relates to a camera with a built-in electronic flash device and an electronic flash device provided with an automatic emission control circuit which emits a flash light, receives reflected light having been reflected by an photographic object by a light receiving element, and stops the emission of the flash light when the reflected light reaches a specified amount.

It has been heretofore known an automatic control electronic flash device which emits a flash light, receives reflected light having been reflected by a photographic object by a light receiving element provided in an electronic flash circuit, and stops the emission of the flash light when the reflected light reaches a specified amount; it has been proposed to build such an automatic control electronic flash device in a lens-fitted film unit or a simple camera. According to this, without providing a complex flash-automatic stop mechanism which varies the aperture stop in accordance with the photographing distance, a proper exposure can be always obtained regardless of the variation of the photographing distance, because the amount of flash light varies in accordance with the photographing distance with the aperture stop kept constant.

In the case where such an automatic control electronic flash device as mentioned in the above is built in a lens-fitted film unit or a simple camera, automatic emission control can be made from the shortest distance to the longest distance. In the above, the shortest distance implies the shortest photographing distance determined by the limit of exposure and focusing, and the longest distance implies the longest photographing distance determined by the guide number at full emission of flash light and the predetermined constant aperture stop value. To practice an automatic emission control at a distance falling within the above-mentioned range implies theoretically that a flash light is emitted in such a manner as to reach a light quantity suitable corresponding to the guide number, that is, the product of the constant aperture stop value multiplied by the photographing distance.

However, practically it is difficult to control the light quantity in such a manner as to reach the theoretical amount of light emission; a dispersion of the amount of light emission is produced owing to a dispersion of electrical parts etc. In order to make the amount of light emission having such a dispersion come close to the theoretical amount of light emission, it has been necessary to use high-priced electrical parts having very little dispersion or to make an adjustment for each device using a variable resistor or the like. As the result of this, an electronic flash device provided with an automatic emission control circuit became of high price, which made it difficult to build it in a lens-fitted film unit or a simple camera to which low price is essential.

In view of the above-mentioned problem, the inventors, after having carried out various photographing tests using a color negative film, found out an emission control level without practical problem even if there is a dispersion to some extent. It is an object of this invention to propose a camera with a built-in electronic flash device and an electronic flash device provided with an automatic emission control circuit having such an emission control level.

Further, another object of this invention will be explained below.

It has been heretofore known an electronic flash device which emits flash light, receives reflected light having been reflected by a photographic object by a light receiving element provided in an electronic flash circuit, and stops the emission of the flash light by actuating a thyristor when the reflected light reaches a specified amount; it has been proposed to build such an electronic flash device in a lens-fitted film unit or a simple camera. According to this, without providing a complex flash-automatic stop mechanism which varies the aperture stop in accordance with the photographing distance, a proper exposure can be always obtained regardless of the variation of the photographing distance, because the amount of flash light varies in accordance with the photographing distance with the aperture stop kept constant.

A switching device composed of a thyristor or the like has a characteristic such that the performance varies in accordance with the variation of environmental temperature. Accordingly, if a switching device is used in an electronic flash device provided with an automatic emission control circuit, the emission control capability varies with temperature variation. Further, if the emission control capability is varied too much by the temperature dependence of the switching device, a proper exposure cannot be made for a film, which makes it meaningless to build an automatic emission control circuit in the flash device. For this reason, it is necessary to use a switching device having a temperature characteristic regulated in a certain range; however, heretofore it has not been known how to regulate the temperature characteristic of a switching device for an automatic emission control circuit.

This invention has been made in view of the above-mentioned problem; it is another object of this invention to propose an electronic flash device provided with an automatic emission control circuit having the temperature characteristic of the switching device regulated within a proper range.

On the other hand, the less becomes the variation of the emission control capacity owing to the temperature characteristic of the switching device composed of a thyristor or the like, the more desirable it is for the automatic emission control circuit.

This invention has been made in view of the above-mentioned problem; it is still another object of this invention to propose an electronic flash device provided with an automatic emission control circuit which is less susceptible to the influence of the temperature characteristic of the switching device.

Further, it was large the size of a switching device composed of a thyristor or the like for use in an electronic flash device provided with a conventional automatic emission control circuit, and its unit price also was high. For this reason, it has been difficult to build an electronic flash device provided with an automatic emission control circuit in a lens-fitted film unit or a simple camera which is of small size and of low price.

This invention has been made in view of the above-mentioned problem; it is still another object of the invention to propose an electronic flash device provided with an automatic emission control circuit having a small-sized and low-priced switching device.

SUMMARY OF THE INVENTION

The above-mentioned objects can be accomplished by any one of structures described below.

Structure 1: A camera with a built-in electronic flash device comprising a photographing lens, an aperture stop, a flash emitting portion, a light receiving element for receiving reflected light by a photographic object which has been emitted by the flash emitting portion, and a flash circuit for making the flash emitting portion emit light having an automatic emission control circuit which stops the emission of the flash emitting portion when the amount of the reflected light received by the light receiving element reaches a specified value, wherein with respect to the automatic emission control circuit, A min satisfies the following conditional expression for a theoretical exposure value A, $(A-1)EV \leq A \text{ min} \leq (A+0.5)EV,$ where A min is a minimum exposure value for a recording medium on which a specified photographic object is recorded when the photographic object located at a distance falling within a range from a specified shortest distance to a distance determined by the guide number of the flash emitting portion at full emission and the aperture stop is photographed.

Structure 2: A camera with a built-in electronic flash device as set forth in structure 1, wherein A max and the aforesaid minimum exposure value A min satisfy the following conditional expression, $0.3 \, EV \leq A \text{ max} - A \text{ min},$ where A max is a maximum exposure value for a recording medium on which a specified photographic object is recorded when the photographic object located at a distance falling within a range from a specified shortest distance to a distance determined by the guide number of the flash emitting portion at full emission and the aforesaid aperture stop is photographed.

Structure 3: A camera with a built-in electronic flash device as set forth in structure 1, wherein A min satisfies the following conditional expression, $(A-0.5)EV \leq A \text{ min} \leq (A+0.5)EV.$ Structure 4: A camera with a built-in electronic flash device as set forth in structure 1, wherein with respect to the automatic emission control circuit, A max satisfies the following conditional expression, $A \text{ max} \leq (A+1.5)EV,$ where A max is a maximum exposure value for a recording medium on which a specified photographic object is recorded when the photographic object located at a distance falling within a range from a specified shortest distance to a distance determined by the guide number of the flash emitting portion at full emission and the aperture stop is photographed.

Structure 5: A camera with a built-in electronic flash device as set forth in structure 1, wherein A max satisfies the following conditional expression, $A \text{ max} \leq (A+1.2)EV.$ Structure 6: A camera with a built-in electronic flash device as set forth in structure 1, wherein the aforesaid shortest distance is set at 1 m.

Structure 7: A camera with a built-in electronic flash device as set forth in structure 1, wherein the camera with a built-in electronic flash device is a lens fitted film unit.

Structure 8: A camera with a built-in electronic flash device as set forth in structure 1, wherein the aforesaid automatic emission control circuit has a switching device, and the automatic emission control circuit stops the emission of the aforesaid flash emitting portion by actuating the switching device when the amount of the reflected light received by the aforesaid light receiving element reaches a specified value.

Structure 9: A camera with a built-in electronic flash device as set forth in structure 8, wherein D/C is from 1 to 1.4, where C is the threshold gate voltage of the aforesaid switching device at the environmental temperature of 25° C., and D is the threshold gate voltage of the switching device at the environmental temperature of 0° C.

Structure 10: A camera with a built-in electronic flash device as set forth in structure 8, wherein the aforesaid switching device is such one that the threshold gate voltage varies in accordance with environmental temperature, and the aforesaid automatic emission control circuit has a temperature compensating element for varying the applied voltage to the gate of the switching device to such a direction that the threshold gate voltage of the switching device varies in accordance with environmental temperature.

Structure 11: A camera with a built-in electronic flash device as set forth in structure 8, wherein the current square time product of the aforesaid switching device is from 1 $A^2S$ to 32 $A^2S$, the aforesaid flash circuit has a main capacitor, and the capacitance of the main capacitor is from 10 $\mu F$ to 120 $\mu F$.

Structure 12: A camera with a built-in electronic flash device as set forth in structure 8, wherein the aforesaid switching device is a thyristor.

Structure 13: A camera with a built-in electronic flash device comprising a photographing lens, an aperture stop, a flash emitting portion, a light receiving element for receiving a reflected light by a photographic object which has been emitted by the flash emitting portion, and a flash circuit for making the flash emitting portion emit light having an automatic emission control circuit which stops the emission of the flash emitting portion when the amount of the reflected light received by the light receiving element reaches a specified value, wherein with respect to the automatic emission control circuit, A min and A max satisfy the following conditional expressions for a theoretical exposure value A, $(A-1)EV \leq A \text{ min} \leq (A+0.5)EV,$ and $0.3 \, EV \leq A \text{ max} - A \text{ min},$ where A min and A max are a minimum exposure value and a maximum exposure value respectively for a recording medium on which a specified photographic object is recorded when the photographic object located at a distance falling within a range from a specified shortest distance to a distance determined by the guide number of the flash emitting portion at full emission and the aperture stop is photographed.

Structure 14: An electronic flash device comprising a flash emitting portion, and a flash circuit having an automatic emission control circuit for making the flash emitting portion emit light, wherein the automatic emission control circuit stops the emission of the flash emitting portion when the amount of the reflected light by a photographic object which has been emitted by the flash emitting portion reaches a specified value, and with respect to the automatic emission control circuit, A min satisfies the following conditional expression for a theoretical exposure value A, $$(A-1)EV \leq A\text{ min} \leq (A+0.5)EV,$$

where A min is a minimum exposure value for a recording medium on which a specified photographic object is recorded when the photographic object located at a distance falling within a range from a specified shortest distance to a distance determined by the guide number of the flash emitting portion at full emission and the aperture stop is photographed.

Structure 15: An electronic flash device comprising a flash emitting portion, and a flash circuit having an automatic emission control circuit for making the flash emitting portion emit light, wherein the automatic emission control circuit stops the emission of the flash emitting portion when the amount of the reflected light by a photographic object which has been emitted by the flash emitting portion reaches a specified value, and with respect to the automatic emission control circuit, A min and A max satisfy the following conditional expressions for a theoretical exposure value A, $$(A-1)EV \leq A\text{ min} \leq (A+0.5)EV,$$

and $$0.3\ EV \leq A\text{ max} - A\text{ min},$$

where A min and A max are a minimum exposure value and a maximum exposure value respectively for a recording medium on which a specified photographic object is recorded when the photographic object located at a distance falling within a range from a specified shortest distance to a distance determined by the guide number of the flash emitting portion at full emission and the aperture stop is photographed.

Further, desirable structures are such ones as described below.

Structure 16: A camera with a built-in electronic flash device provided with an automatic emission control circuit which emits a flash light, receives the reflected light having been reflected by an photographic object by a light receiving element, and stops the emission of the flash light when the amount of the reflected light reaches a specified value, wherein the automatic emission control circuit carries out the emission control in a manner such that A min satisfies the following conditional expression for a theoretical exposure value A, $$(A-1)EV \leq A\text{ min} \leq (A+0.5)EV,$$

where A min is a minimum exposure value for a recording medium on which a specified photographic object is recorded when the photographic object located at a distance falling within a range from a specified shortest distance to a distance determined by the guide number at full emission and the aperture stop is photographed.

Structure 17: A camera with a built-in electronic flash device as set forth in structure 16, wherein the automatic emission control circuit carries out the emission control in a manner such that the aforesaid minimum exposure value A min satisfies the following conditional expression for a theoretical exposure value A, $$(A-0.5)EV \leq A\text{ min} \leq (A+0.5)EV.$$

Structure 18: A camera with a built-in electronic flash device as set forth in structure 16 or structure 17, wherein the automatic emission control circuit carries out the emission control in a manner such that A max satisfies the following conditional expression for a theoretical exposure value A, $$A\text{ max} \leq (A+1.5)EV,$$

where A max is a maximum exposure value for a recording medium on which a specified photographic object is recorded when the photographic object located at a distance falling within a range from a specified shortest distance to a distance determined by the guide number at full emission and the aperture stop is photographed.

Structure 19: A camera with a built-in electronic flash device as set forth in structure 18, wherein the automatic emission control circuit carries out the emission control in a manner such that the aforesaid maximum exposure value A max satisfies the following conditional expression for a theoretical exposure value A, $$A\text{ max} \leq (A+1.2)EV.$$

Structure 20: A camera with a built-in electronic flash device as set forth in any one of structures 16 to 19, wherein the aforesaid shortest distance is 1 m.

Structure 21: A camera with a built-in electronic flash device as set forth in any one of structures 16 to 20, wherein the aforesaid camera with a built-in electronic flash device is a lens-fitted film unit.

Structure 22: A camera with a built-in electronic flash device provided with an automatic emission control circuit which emits a flash light, receives the reflected light having been reflected by an photographic object by a light receiving element, and stops the emission of the flash light when the amount of the reflected light reaches a specified value, wherein the automatic emission control circuit carries out the emission control in a manner such that A min satisfies the following conditional expression for a theoretical exposure value A, $$(A-1)EV \leq A\text{ min} \leq (A+0.5)EV,$$

where A min is a minimum exposure value for a recording medium on which a specified photographic object is recorded when the photographic object located at a distance falling within a range from a specified shortest distance of the camera with a built-in electronic flash device to a distance determined by the guide number at full emission and the aperture stop of it is photographed.

Structure 23: An electronic flash device provided with an automatic emission control circuit which emits a flash light, receives the reflected light having been reflected by an photographic object by a light receiving element, and stops the emission of the flash light by actuating a switching device when the amount of the reflected light reaches a specified value, wherein B/A is from 1 to 1.4, where A is the threshold gate voltage of the switching device at the environmental temperature of 25° C., and B is the threshold gate voltage of the switching device at the environmental temperature of 0° C.

Structure 24: An electronic flash device provided with an automatic emission control circuit which emits a flash light, receives the reflected light having been reflected by an photographic object by a light receiving element, and stops the emission of the flash light by actuating a switching device when the amount of the reflected light reaches a specified value, wherein the switching device is such one that the threshold gate voltage varies in accordance with environmental temperature, and a temperature compensating element for varying the voltage applied to the gate of the switching device, to such a direction that the threshold gate voltage of the switching device varies in accordance with environmental temperature, is used for at least one of the electrical elements which makes up the circuit for controlling the gate of the switching device in the automatic emission control circuit.

Structure 25: An electronic flash device provided with an automatic emission control circuit which emits a flash light, receives the reflected light having been reflected by an photographic object by a light receiving element, and stops the emission of the flash light by actuating a switching device when the amount of the reflected light reaches a specified value, wherein a switching device having a current square time product from 1 $A^2S$ to 32 $A^2S$ is used for the switching device, and a capacitor having a capacitance falling within a range from 10 $\mu$F to 120 $\mu$F is used for the main capacitor of the electronic flash device.

Structure 26: An electronic flash device as set forth in any one of structures 23 to 25, wherein the aforesaid switching device is a thyristor.

Structure 27: A camera having built in the aforesaid electronic flash device set forth in any one of structures 23 to 26.

Structure 28: A lens-fitted film unit having built in the aforesaid electronic flash device set forth in any one of structures 23 to 26.

DETAILED DESCRIPTION OF THE PREFERRED EMBODIMENT

Figure 1:
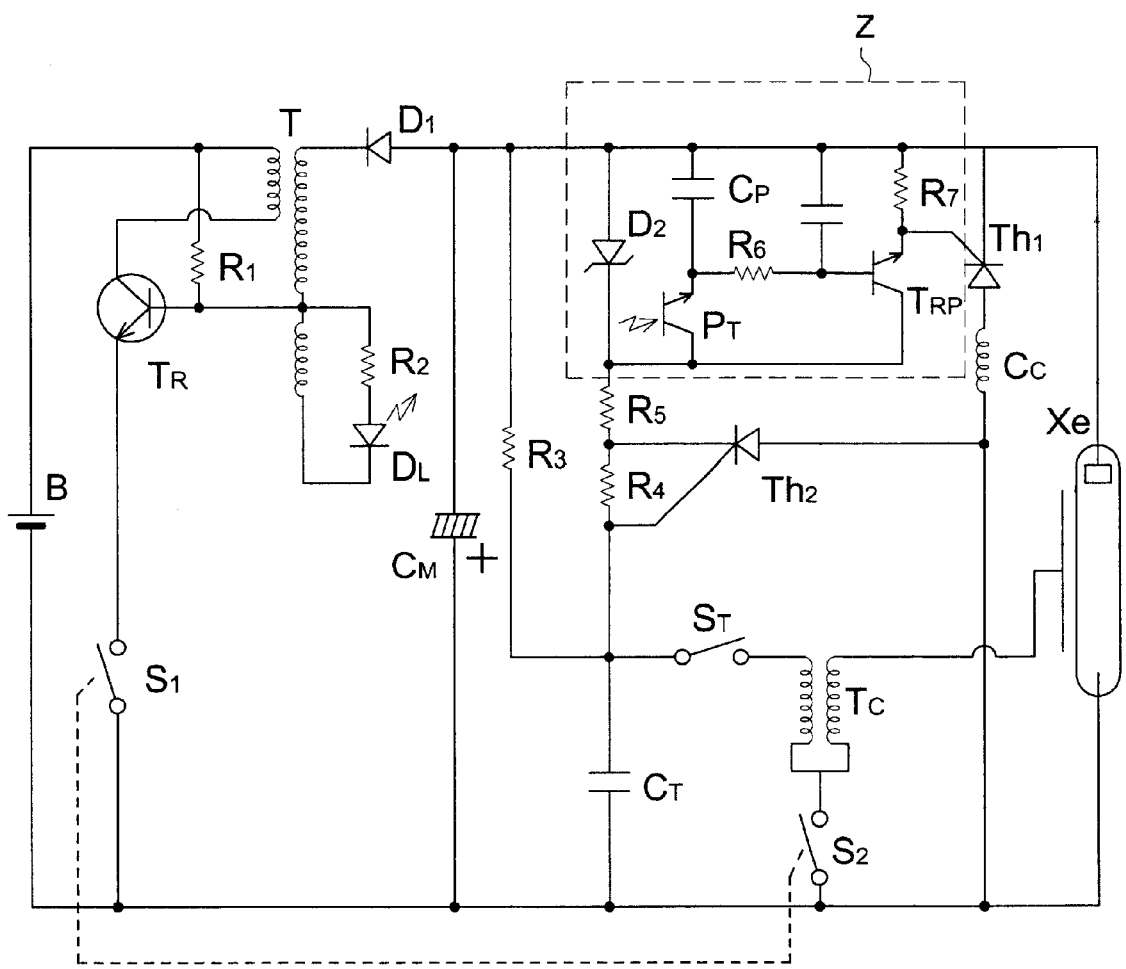
FIG. 1 is a circuit diagram of an electronic flash device having an automatic emission control circuit.

A camera with a built-in electronic flash device of this invention comprises a photographing lens, an aperture stop, a (electronic) flash emitting portion, a light receiving element for receiving a reflected light by a photographic object which has been emitted by the flash emitting portion, and a (electronic) flash circuit for making the flash emitting portion emit light. The flash circuit comprises an automatic emission control circuit which stops the emission of the flash emitting portion when the amount of the reflected light received by the light receiving element reaches a specified value.

With respect to the automatic emission control circuit, A min satisfies the following conditional expression for a theoretical exposure value A:

$(A-1)EV \leq A \min \leq (A+0.5)EV,$ where A min is a minimum exposure value for a recording medium on which a specified photographic object is recorded when the photographic object located at a distance falling within a range from a specified shortest distance to a distance determined by the guide number of the flash emitting portion at full emission and the aperture stop is photographed.

Desirably, A min should satisfy the following conditional expression:

$(A-0.5)EV \leq A \min \leq (A+0.5)EV,$

As described in the above, "a specified shortest distance" implies the shortest photographing distance determined by the limit of exposure and focusing; however, in the case where such a description as "photographing distance of this camera is from X m to XX m (desirably, photographing distance at flash photographing)", the shortest distance may be regarded as the shortest distance mentioned in the above. Further, "a distance (D) determined by the guide number ($G_0$) of the flash emitting portion at full emission and the aperture stop (F)" can be obtained from an expression consisting of $G_0$, F, D, and ISO to be described later. Moreover, "full emission" mentioned in the above implies desirably the state of emission of the electronic flash device after charging for 20 seconds or over by a fresh battery.

Besides, the electronic flash device comprises a flash emitting portion for emitting a flash light and a flash circuit for making it emit a flash light. It is desirable that the flash emitting portion comprises a flash emitting tube, a reflection umbrella, a flash transmitting window, a holder member, etc. Further, the flash circuit comprises an automatic emission control circuit. In addition, it may be appropriate that the electronic flash device comprises a light receiving element or the electronic flash device does not comprise a light receiving element and some other member in the camera with a built-in electronic flash device comprises a light receiving element.

Further, in the scope of a camera of this invention, a usual camera for a silver halide film, a lens-fitted film unit loaded with a film beforehand, and a digital camera are also included. Desirably, it should be a lens-fitted film unit.

Moreover, it is more desirable that A max and A min satisfy the following conditional expression:

$0.3 \, EV \leq A \max - A \min,$ where A max and A min are a maximum exposure value and a minimum exposure value respectively for a recording medium on which a specified photographic object is recorded when the photographic object located at a distance falling within a range from a specified shortest distance to a distance determined by the guide number of the flash emitting portion at full emission and the aperture stop is photographed.

Figure 5:
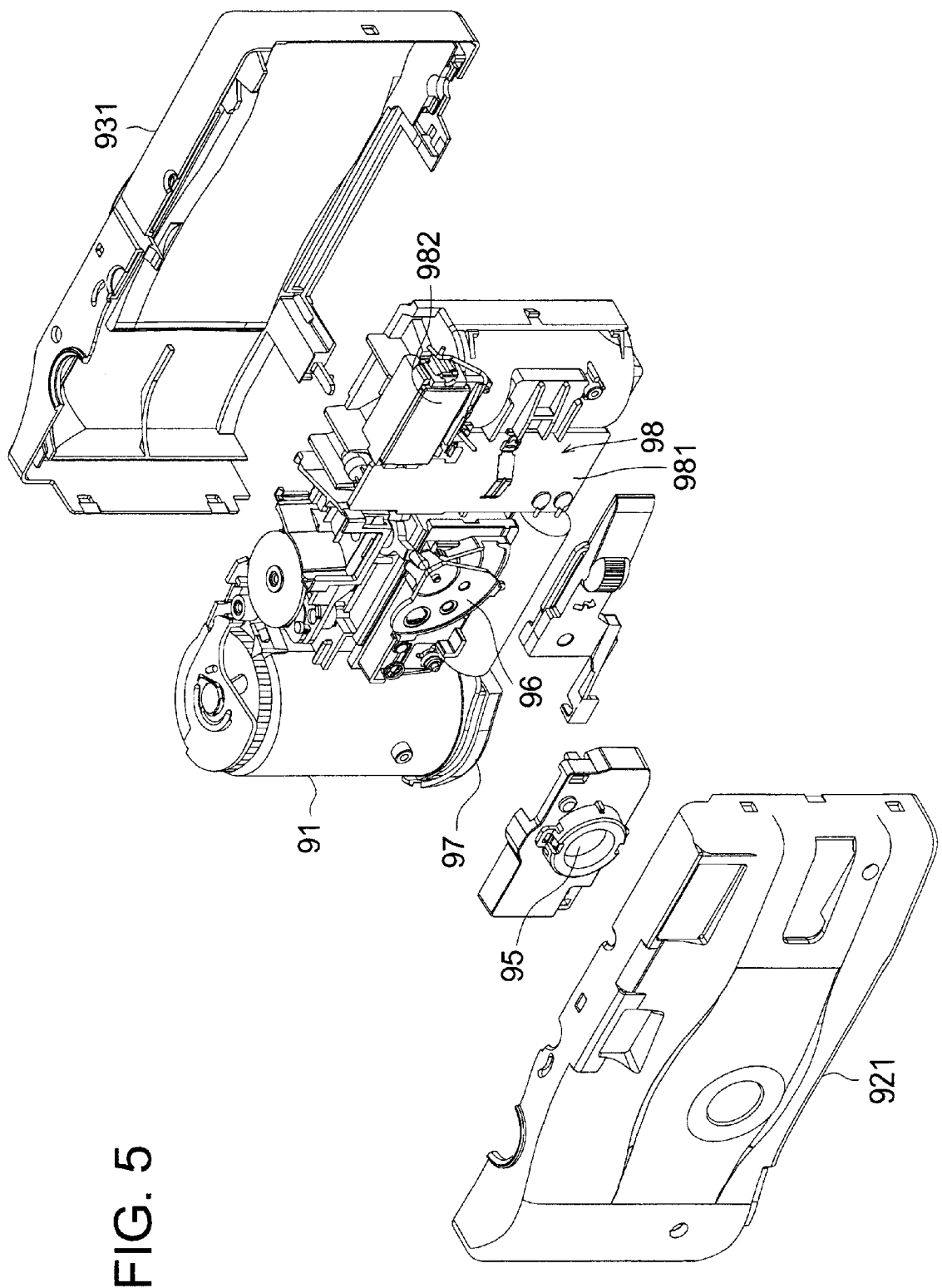
FIG. 5 is an exploded perspective view of a lens-fitted film unit.

Further, A max and A min should desirably satisfy the following conditional expression:

$0.5 \, EV \leq A \max - A \min \leq 3 \, EV,$ and more preferably $0.3 \, EV \leq A \max - A \min \leq 3 \, EV.$ Further, it is desirable that A max $\leq$ (A+1.5) EV.
It is more desirable that A max $\leq$ (A+1.2) EV.
Now, a lens-fitted film unit will be explained by referring to the drawing. FIG. 5 is an exploded perspective view of a lens-fitted film unit. As shown in FIG. 5, a lens-fitted film unit is composed of the unit main body 91, the front cover 921, the rear cover 931, the photographing lens 95, the shutter unit 96, etc.; in the unit main body 91, the shutter unit 96, the photographing lens 95, etc. are fitted, and the unit main body 91 is covered with the front cover 921 and the rear cover 931. Further, the unit main body 91 has a room for an exposed film in which a cartridge is contained.

Further, the lens-fitted film unit comprises the electronic flash device 98 for carrying out flash photographing. The electronic flash device 98 comprises the flash circuit 981 and the flash emitting portion 982. The flash emitting portion 982 comprises a flash emitting tube for emitting a flash light.

The flash circuit comprises a main capacitor connected parallel to the flash emitting tube, a trigger transformer for applying a trigger voltage to the trigger electrode of the flash emitting tube, a trigger means, resistors, a trigger capacitor which is connected to the main capacitor through a resistor and discharges the accumulated charge to the trigger transformer by the trigger means being turned on, an automatic emission control circuit, etc. In addition, it is desirable that the trigger means is turned on as linked with the shutter opening operation. Besides, for a power source to supply electric power to the electronic flash device, a battery of 1 to 2 V may desirably be used.

First, a flash circuit having an automatic emission control circuit for use in a camera with a built-in electronic flash of this invention will be explained by referring to FIG. 1.

When the main switch $S_1$ is turned on by an external operation, the emission prohibiting switch $S_2$ is also turned on as linked with it, which makes an electric current from the battery B flow through the resistor $R_1$ in the transistor $T_R$ to initiate oscillation; thus, the voltage of the secondary side of the oscillating transformer T is raised to a high voltage. By rectifying the electric current of this secondary side by the diode $D_1$, a high direct current voltage of 300 to 500 V is obtained, and the main capacitor $C_M$ and the trigger capacitor $C_T$ connected parallel to the resistor $R_3$ are charged up. When the main capacitor $C_M$ is charged up to a specified voltage, the light emitting diode $D_L$ connected serially to the resistor $R_2$ is turned on.

At the time of taking a photograph, the trigger switch $S_T$ is turned on as linked with the opening operation of the shutter leaves. Owing to this, a closed circuit made up of the trigger capacitor $C_T$, the trigger switch $S_T$, the primary coil of the trigger transformer $T_C$, and the emission prohibiting switch $S_2$, which are serially connected, is formed, and the charge accumulated in the trigger capacitor $C_T$ is discharged to the primary side of the trigger transformer $T_C$. As the result of this, because a higher voltage is produced in the secondary side of the trigger transformer $T_C$, and it is applied to the trigger electrode of the discharge tube $X_e$, ionized xenon atoms in the discharge tube $X_e$ are exited by colliding with the electrons emitted from the cathode; thus, the discharge tube $X_e$ emits light accompanied by the discharging of the main capacitor $C_M$.

Further, when the trigger switch $S_T$ is turned on, a part of the charge in the main capacitor $C_M$ flows out as the electric current $i_1$ in the resistor $R_4$ through the primary side of the trigger transformer $T_C$ and the trigger switch $S_T$. Moreover, after the discharging of the trigger capacitor $C_T$, a part of the charge in the main capacitor flows out as the electric current $i_2$ in the resistor $R_4$ so as to charge up the trigger capacitor $C_T$. Because the resistors $R_4$ and $R_5$, and the Zener diode $D_2$ with its cathode connected to the resistor $R_5$ are serially connected, the current i as the sum of the current $i_1$ and the current $i_2$ flows in the reverse direction in the Zener diode $D_2$, which generates a Zener voltage.

Further, the phototransistor $P_T$ and the capacitor $C_P$, which are connected serially to each other, are connected parallel to the Zener diode $D_2$. The phototransistor $P_T$ receives the flash light reflected a photographic object. The connecting portion of the phototransistor $P_T$ and the capacitor $C_P$ is connected to the base of the transistor $T_{RP}$ through the resistor $R_6$, and the emitter of the transistor $T_{RP}$ is connected to the gate of the thyristor $Th_1$, which is a switching device. The thyristor $Th_1$ is connected serially to the choke coil $C_C$ for bypassing, and these are connected parallel to the discharge tube $X_e$.

In addition, the resistor $R_6$ is a resistor for controlling the base current of the transistor $T_{RP}$, and the resistor $R_7$ is a resistor for generating the gate voltage of the thyristor $Th_1$.

Accordingly, when the thyristor $Th_1$ is turned on, an electric current larger than the current flowing in the discharge tube $X_e$ flows in the choke coil $C_C$, to exhaust the charge in the main capacitor $C_M$ rapidly, which stops the emission of the discharge tube $X_e$.

When a Zener voltage is generated between the both ends of the Zener diode $D_2$ through the flow of the current i, an electric current flows in the phototransistor $P_T$ in accordance with the reflected light by a photographic object. If the photographing distance is short, the flash light reflected by the photographic object is strong, to make large the current to flow in the phototransistor $P_T$, then the charging speed for the capacitor $C_P$ becomes high. On the other hand, if the photographing distance is long, the flash light reflected by the photographic object is weak, to make small the current to flow in the phototransistor $P_T$, then the charging speed for the capacitor $C_P$ becomes low.

As the result of this, in the case of a short distance, because the transistor $T_{RP}$ is turned on rapidly and also the thyristor $Th_1$ is turned on rapidly, the charge in the main capacitor $C_M$ is run rapidly to the choke coil $C_C$ and exhausted rapidly on the midway of the emission of the discharge tube $X_e$, and the emission of the discharge tube $X_e$ ceases early. On the other hand, in the case of a long distance, because the transistor $T_{RP}$ is turned on slowly and also the thyristor $Th_1$ is turned on slowly, the emission of the discharge tube $X_e$ ceases the emission late. Accordingly, with a constant aperture stop, the reflected light by a photographic object varies in accordance with the photographing distance, which makes the total amount of emission of the flash light vary; therefore, an approximately constant exposure can be obtained even though the photographing distance varies.

In addition, because chattering is generated when the trigger switch is turned on, which makes the operation unstable, the thyristor $Th_2$ is provided for preventing this.

The inventors fitted such an electronic flash device having an automatic emission control circuit in a lens-fitted film unit and carried out a photographing test and the measurement of the automatic emission control flash; the way of above-mentioned photographing test will be explained by referring to FIG. 2.

Figure 2:
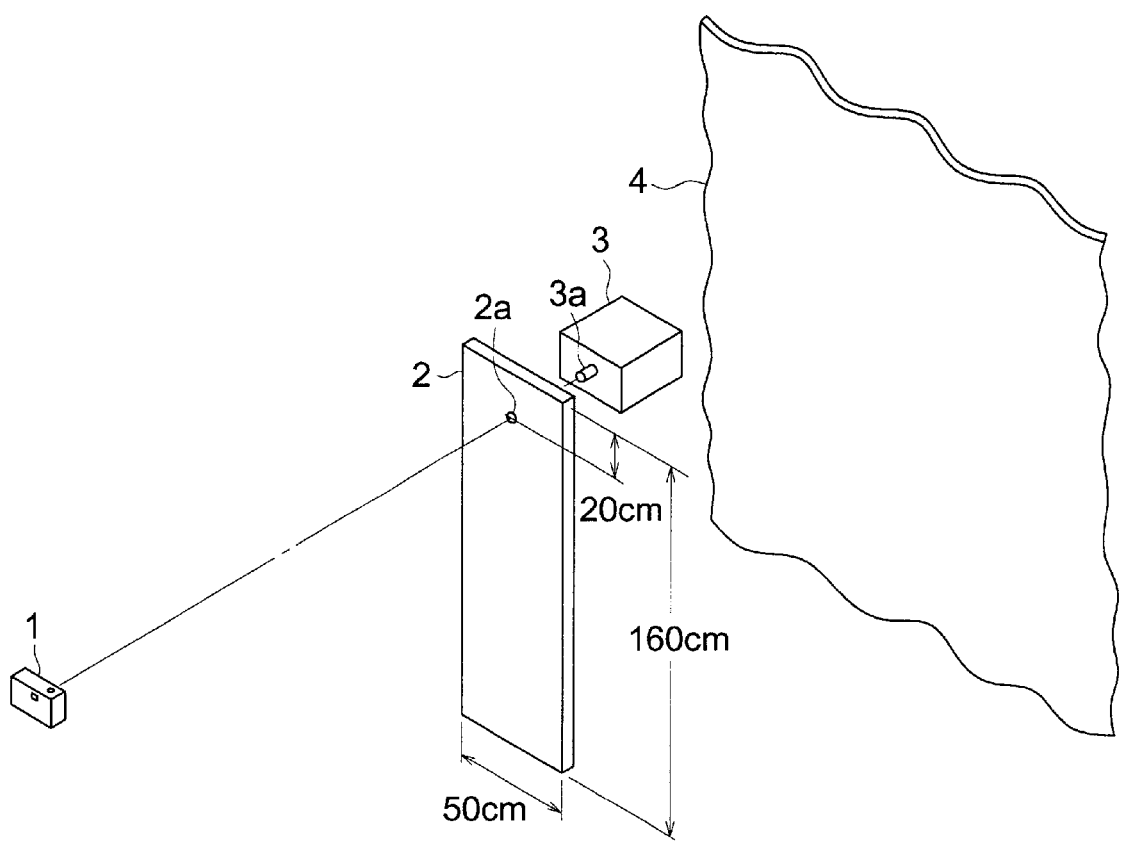
FIG. 2 is a perspective view showing the method of photographing.

In FIG. 2, the numeral 1 denotes a lens-fitted film unit; the aperture stop value of the photographing lens in the lens-fitted film unit 1 when a flash light is used is F6.7, the loaded film is a color negative film, whose sensitivity is ISO800, and the maximum guide number at full emission of the flash light is 7. Accordingly, the theoretical longest photographing distance when the flash light is used is 3 m.

Numeral 2 denotes a standard reflection plate for reflecting a flash light; it has a reflectance of 18%, and has a gray non-glazed surface finish. The size is 50 cm widthwise and 160 cm lengthwise, which is approximately equal to the human size. Further, the optical axis of the photographing lens of the lens-fitted film unit 1 is directed to a position of 20 cm from the top of the standard reflection plate 2; at this position, the through hole 2a is provided, and the sensor portion 3a of the flash meter 3 disposed at a rearward position faces the through hole 2a.

In addition, the standard reflection plate 2 and the flash meter 3 are provided for measuring the amount of emission of the flash light under emission control, and taking photographs was carried out in the same condition for a mannequin arranged in place of the standard reflection plate and the flash meter.

4 denotes a blackout curtain to be a background; it is formed to have a reflectance of 5% or under, and is disposed 3 meters or over away from the standard reflection plate 2. Accordingly, in this case, 3 m is "a distance determined by the guide number of the flash emitting portion at full emission and the aperture stop".

In this way, for varied distances between the lens unit with a lens attached and the mannequin, a number of times of photographing was carried out, and the dispersion of the amount of emission based on the emission control by the automatic light control flash device in one and the same condition was measured. In addition, this test was carried out at the normal temperature of 20° C. and normal humidity. Representative data obtained by this test are shown in FIG. 3.

Figure 3:
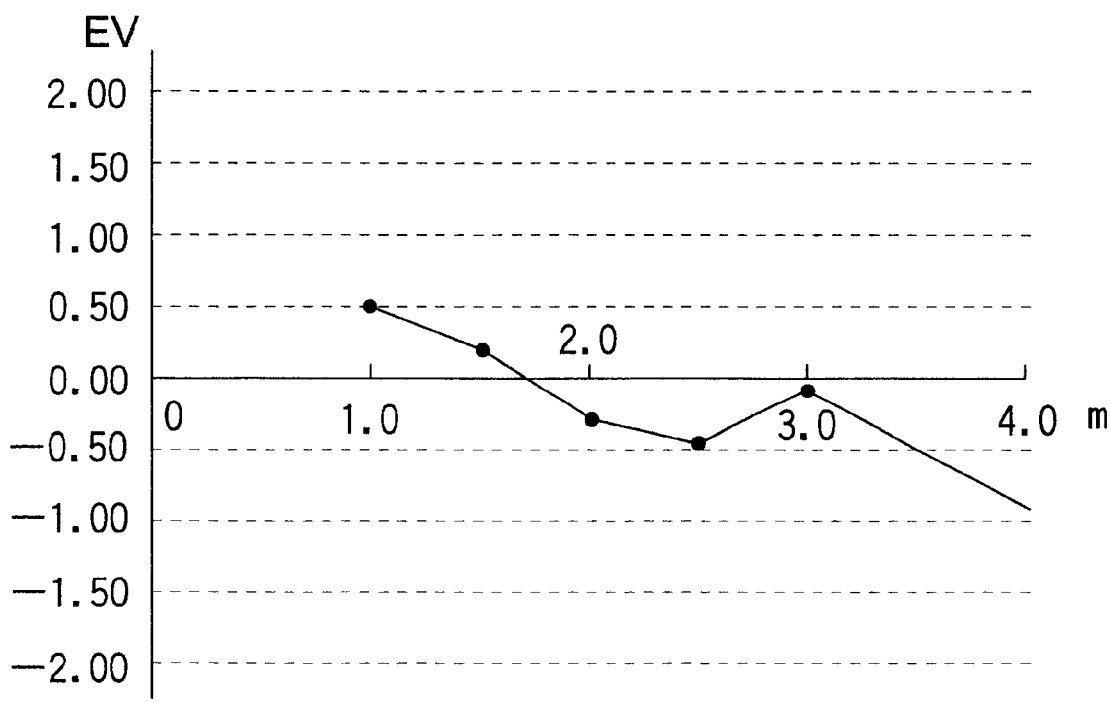
FIG. 3 is a representative graph of emission control data actually measured.

In FIG. 3, the abscissa indicates photographing distances, and photographing was done at from the shortest distance of 1 m to 4 m. The ordinate indicates the amounts of emission converted into exposure values; if the automatic emission control flash device has a theoretical characteristic, the exposure value is (A+0) EV for the distances 1 m to 3 m, and from 3 m and over, the flash device makes full emission but exposure value decreases to the negative direction.

According to the result of the test, it was found out that the exposure value need not be a theoretical value, that is (A+0) EV, for the distances from 1 m to 3 m, and a sufficient effect by the emission control flash device can be obtained on the printed images even if there is a predetermined amount of dispersion. That is, it was found out that, with respect to the dispersion, it is suitable to set the minimum exposure value for the distances from 1 m to 3 m at a value falling within a range from −1 EV to +0.5 EV of the theoretical exposure value. If the exposure is extremely insufficient, color reproducibility is degraded, but by making the above-mentioned setting, a photograph with an extremely insufficient exposure could not be observed and it did not also occur that a human face is photographed in a dark color. Moreover, it is more desirable that the minimum exposure value for the distances from 1 m to 3 m is made to fall within a range from −0.5 EV to +0.5 EV of the theoretical exposure value.

Further, it is desirable that the maximum exposure value for the distances from 1 m to 3 m is set at a value of +1.5 EV or under of the theoretical exposure value. If the maximum exposure value exceeds the value of +1.5 EV of the theoretical exposure value, the difference in the exposure amount between the main photographic object illuminated by the flash light and the background becomes large, and the effect by the emission control flash device cannot be sufficiently obtained on a printed image. In addition, it is more desirable that the maximum exposure value for the distances from 1 m to 3 m is set at a value of +1.2 EV or under of the theoretical exposure value.

Further, it is desirable that the difference between the maximum exposure value and the minimum exposure value based on the theoretical exposure value for the distances from 1 m to 3 m is made to be 0.3 EV or over. In order to make the difference between the maximum exposure value and the minimum exposure value smaller than 0.3 EV, it becomes necessary to use a high-priced electrical part or to make an adjustment at the time of manufacturing by using an adjustable electrical part such as a variable resistor, which makes it difficult to obtain a flash device having an automatic emission control circuit with a small number of parts and without making an adjustment. In addition, it is more desirable to make the difference between the maximum exposure value and the minimum exposure value 0.3 EV or over.

Now, it will be explained how to obtain the dispersion of the exposure amounts.

Let F denote the aperture stop at the time of flash photographing, D (m) denote the photographing distance, ISO denote the sensitivity of the film contained (the sensitivity of the recording medium); then, the theoretical guide number $G_0$ of the flash device can be expressed by the following expression:

$$G_0 = F \times D \times \sqrt{100/ISO}$$

Further, as explained in FIG. 2, the measurement of the dispersion of the amounts of exposure is carried out by using the standard reflection plate 2 and the flash meter 3, and for the guide number $G_1$ measured by flash meter, the dispersion of the amounts of exposure can be expressed by the following expression:

$$\Delta EV = \log(G_1/G_0)/\log \sqrt{2}$$

Further, in FIG. 3, the minimum exposure value when a specified photographic object located at a distance falling within a range from a specified shortest distance to a distance determined by the guide number of the flash emitting portion at full emission and the aperture stop is photographed is −0.43 EV (2.5 m) of the theoretical exposure value, and the maximum exposure value is +0.48 EV (1.0 m) of the theoretical exposure value; the effect by the emission control flash device was sufficiently obtained on the printed images.

In addition, in the explanation up to now, it has been taken for instance the case where the specified shortest distance is 1 m, and the distance determined by the guide number of the flash device at full emission, the aperture stop when the flash device is used, and the sensitivity of the film contained is 3 m; however, if the dispersion of the amounts of light emission satisfies the above-mentioned condition for a distance falling within a range from a shortest distance at which photographing can be done set on the basis of the limit of exposure and focusing for each kind of products to a distance determined by the guide number of the flash device at full emission, the aperture stop when the flash device is used, and the sensitivity of the film, it has become possible to provide a flash device provided with an automatic emission control circuit, which makes it possible to obtain a sufficient effect by the emission control flash device on a printed image, without using a high-priced electrical part having a small dispersion and making an adjustment for each of the flash devices by using an adjustable electrical part such as a variable resistor.

Figure 4:
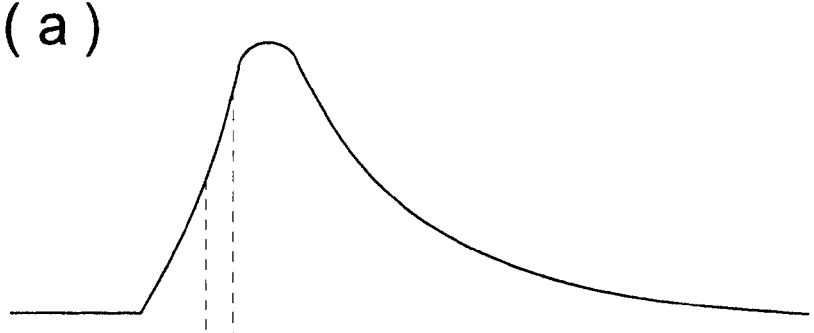
FIGS. 4(a), 4(b), and 4(c) are drawings showing wave shapes of a flash light respectively.
Figure 4:
Figure 4:

In the following, the variation of the amount of flash light owing to the temperature characteristic of the thyristor $Th_1$ as a switching device will be explained by referring to FIGS. 4(*a*) to 4(*c*). FIGS. 4(*a*) to 4(*c*) are drawings of flash light wave forms.

When a flash light is emitted, it has such a wave form as shown in FIG. 4(*a*), and the integral wave form obtained by integrating this flash light wave form becomes such one as shown in FIG. 4(*b*). In this case, if there is a photographic object at the specified distance, light control is done as described in the above; however, the threshold gate voltage of the thyristor $Th_1$ depends on the environmental temperature. Owing to this, the emission ceasing time of the discharge tube $X_e$ fluctuates, to give a different emission wave form as shown in FIG. 4(*c*). In this drawing, the emission wave forms at the environmental temperatures of 25° C. and 0° C. are shown. In this way, the emission ceasing time comes later at a low temperature than at the normal temperature, which makes the amount of emission of the flash light larger and the exposure more excessive.

However, a photograph taken by a too excessive exposure becomes unsightly although it is taken at a low temperature, and that makes the built-in automatic emission control circuit meaningless. Therefore, the inventors carried out a large number of photographing tests, and found out that, with respect to the photographing distance of 2 m, there is no practical problem if the amount of light emission at 0° C. is within two times the amount of light emission at 25° C. This fluctuation is within 1 EV if it is converted into exposure value.

As the result of an experiment, it was found out that, for the threshold gate voltage of the thyristor $Th_1$ of 0.6 V at the environmental temperature of 25° C. in the standard photographing state, the threshold gate voltage of the thyristor $Th_1$ corresponding to this difference of exposure value of 1 EV is 0.84V. In addition, the ideal condition is that the threshold gate voltage at the environmental temperature of 0° C. is equal to the threshold gate voltage at the environmental temperature of 25° C. Accordingly, assuming that C denotes the threshold gate voltage of the thyristor $Th_1$ at the environmental temperature of 25° C., and D denotes the threshold gate voltage of the thyristor $Th_1$ at the environmental temperature of 0° C., if A and B satisfy the condition that D/C is from 1 to 1.6, the dispersion of the amounts of exposure value can be suppressed within 1 EV. More preferably, D/C is from 1 to 1.4.

For a thyristor satisfying this condition, for example, "8P4J" manufactured by NEC can be cited.

Moreover, in the case where it is desired to make the dispersion of the amounts of exposure smaller, it is desirable to use a temperature compensating element such as a thermistor for the electrical element to control the gate voltage of the thyristor $Th_1$.

For example, a temperature compensating element having a positive characteristic is used in place of the resistor $R_6$. The positive characteristic implies a characteristic such that the resistance value becomes smaller if the temperatures becomes lower. As described in the above, the threshold gate voltage becomes higher at lower temperatures; when the resistance value of the temperature compensating element substituted for the resistor $R_6$ becomes small relatively to the resistor $R_7$, the base current becomes larger. As the result of this, also the collector current becomes larger, which makes the gate voltage generated by the resistor $R_7$ larger too; thus, the temperature dependence of the thyristor $Th_1$ can be cancelled.

Further, a temperature compensating element having a negative characteristic may be used in place of the resistor $R_7$. The negative characteristic implies a characteristic such that the resistance value becomes larger if the temperatures becomes lower. The threshold gate voltage should be higher at lower temperatures; when the resistance value of the temperature compensating element substituted for the resistor $R_7$ becomes large relatively to the resistor $R_6$, the gate voltage generated by the resistor $R_7$ becomes larger as the result; thus, the temperature dependence of the thyristor $Th_1$ can be cancelled. In addition, the part indicated by Z in FIG. 1 is the circuit for controlling the gate of the switching device.

Besides, both of the resistor $R_6$ and the resistor $R_7$ may be made temperature compensating elements.

Further, the thyristor $Th_1$ as used in a conventional electronic flash device of a camera has a current square time product larger than 32 $A^2S$, and owing to this, it has a large size and is of high price. However, for a lens-fitted film unit, because the sensitivity of the film contained in it is so high as ISO400 or ISO800, it is possible to make small the capacitance of the main capacitor $C_M$ as 160 $\mu F$ or under, more preferably, as 120 $\mu F$ or under. Therefore, for the thyristor $Th_1$, it has become possible to use one having a current square time product of 32 $A^2$ or under, and also it has become possible to make its size small and its price low.

Further, it is possible to make the capacitance of the main capacitor $C_M$ 10 $\mu F$ at the lowest by using a film having a higher sensitivity or by using a photographing lens of higher speed; in this case, it is possible to use a thyristor having a current square time product of 1 $A^2S$ for the thyristor $Th_1$. Therefore, the lower limit of the current square time product of the thyristor $Th_1$ is made to be 1 $A^2S$.

In this way, for the thyristor $Th_1$, by selecting a thyristor having a current square time product falling within a range from 1 $A^2S$ to 32 $A^2S$, it has become possible to obtain a small-sized electronic flash device having an automatic emission control circuit.

According to a camera with a built-in electronic flash device as set forth in any one of structures 16 to 21, or an electronic flash device as set forth in structure 22, because there is no practical problem even if a dispersion specified in the structures is allowed in the case where an automatic emission control circuit is provided, it has become unnecessary to use a high-priced electrical part having a very small dispersion, or to make an adjustment for each device by using a variable resistor or the like. As the result of it, it has become possible to build an electronic flash device provided with an automatic emission control circuit in a lens-fitted film unit or a simple camera to which low price is essential.

According to an electronic flash device as set forth in any one of structures 23 and 26, a camera as set forth in structure 27, or a lens-fitted film unit as set forth in structure 28, the temperature characteristic of the switching device in the automatic emission control circuit is regulated within a proper range; therefore, the production of a photograph taken by an unsuitable exposure can be prevented regardless of temperature variation.

According to an electronic flash device as set forth in any one of structures 24 and 26, a camera as set forth in structure 27, or a lens-fitted film unit as set forth in structure 28, it is possible to make smaller the influence of the temperature characteristic of the switching device in the automatic emission control circuit, and further, the production of a photograph taken by an unsuitable exposure can be prevented.

According to an electronic flash device as set forth in any one of structures 25 and 26, a camera as set forth in structure 27, or a lens-fitted film unit as set forth in structure 28, it is possible to make the switching device in the automatic emission control circuit of smaller size and of lower price; therefore, it is possible to build easily an electronic flash device provided with an automatic emission control circuit in a small-size low-priced camera or lens-fitted film unit.

Disclosed embodiment can be varied by a skilled person without departing from the spirit and scope of the invention.

What is claimed is:

1. A camera with a built-in electronic flash device, comprising:
   (a) a photographing lens;
   (b) an aperture stop;
   (c) an electronic flash emitting portion;
   (d) a light receiving element for receiving light reflected on a photographic object which has been emitted by the electronic flash emitting portion; and
   (e) an electronic flash circuit for making the electronic flash emitting portion emit light, the flash circuit comprising an automatic emission control circuit which stops emission of the electronic flash emitting portion when an amount of the reflected light received by the light receiving element reaches a specified value, wherein with respect to the automatic emission control circuit, A min satisfies the following conditional expression, $$(A-1)EV \leq A\ min \leq (A+0.5)EV,$$

where A min represents a minimum exposure value for a recording medium on which a specified photographic object is recorded when the photographic object that is located at a distance falling within a range from a specified shortest distance to a distance determined by both a guide number obtained when the electronic flash emitting portion emits light at full emission and the aperture stop, is photographed, and A represents a theoretical exposure value.

2. The camera with the built-in electronic flash device of claim 1, wherein the following conditional expression is satisfied, $$0.5\ EV \leq A\ max - A\ min,$$

where A max represents a maximum exposure value for the recording medium on which the specified photographic object is recorded when the photographic object that is located at the distance falling within the range from the specified shortest distance to the distance determined by both the guide number obtained when the electronic flash emitting portion emits light at full emission and the aperture stop, is photographed.

3. The camera with the built-in electronic flash device of claim 1, wherein the following conditional expression is satisfied, $$(A-0.5)EV \leq A\ min \leq (A+0.5)EV.$$

4. The camera with the built-in electronic flash device of claim 1, wherein the following conditional expression is satisfied, $$A\ max \leq (A+1.5)EV,$$

where A max represents a maximum exposure value for the recording medium on which the specified photographic object is recorded when the photographic object that is located at the distance falling within the range from the specified shortest distance to the distance determined by both the guide number obtained when the electronic flash emitting portion emits light at full emission and the aperture stop, is photographed.

5. The camera with the built-in electronic flash device of claim 4, wherein the following conditional expression is satisfied, $$A\ max \leq (A+1.2)EV.$$

6. The camera with the built-in electronic flash device of claim 1, wherein the specified shortest distance is set at 1 m.

7. The camera with the built-in electronic flash device of claim 1, wherein the camera with the built-in electronic flash device is a lens fitted film unit with a built-in electronic flash device.

8. The camera with the built-in electronic flash device of claim 1, wherein the automatic emission control circuit comprises a switching device, and the automatic emission control circuit stops the emission of the electronic flash emitting portion by actuating the switching device when the amount of the reflected light received by the light receiving element reaches the specified value.

9. The camera with the built-in electronic flash device of claim 8, wherein the following conditional expression is satisfied, $$1 \leq D/C \leq 1.6,$$

where C represents a threshold gate voltage of the switching device at an environmental temperature of 25° C., and D represents a threshold gate voltage of the switching device at the environmental temperature of 0° C.

10. The camera with the built-in electronic flash device of claim 8, wherein the switching device is arranged such that a threshold gate voltage varies in accordance with environmental temperature, and the automatic emission control circuit comprises a temperature compensating element for varying an applied voltage to a gate of the switching device in a direction in which the threshold gate voltage of the switching device varies in accordance with the environmental temperature.

11. The camera with the built-in electronic flash device of claim 8, wherein a current square time product of the switching device is not less than 1 $A^2S$ and not more than 32 AS, the electronic flash circuit has a main capacitor, and capacitance of the main capacitor is not less than 10 $\mu F$ and not more than 160 $\mu F$.

12. The camera with the built-in electronic flash device of claim 8, wherein the switching device is a thyristor.

13. A camera with a built-in electronic flash device, comprising:

(a) a photographing lens;

(b) an aperture stop;

(c) an electronic flash emitting portion;

(d) a light receiving element for receiving light reflected on a photographic object which has been emitted by the electronic flash emitting portion; and (e) an electronic flash circuit for making the electronic flash emitting portion emit light, the flash circuit comprising an automatic emission control circuit which stops emission of the electronic flash emitting portion when an amount of the reflected light received by the light receiving element reaches a specified value, wherein with respect to the automatic emission control circuit, A min and A max satisfy the following conditional expressions, $$(A-1)EV \leq A\ min \leq (A+0.5)EV,$$

and $$0.5\ EV \leq A\ max - A\ min,$$

where A min and A max are a minimum exposure value and a maximum exposure value respectively for a recording medium on which a specified photographic object is recorded when the photographic object that is located at a distance falling within a range from a specified shortest distance to a distance determined by both a guide number obtained when the electronic flash emitting portion emits light at full emission and the aperture stop, is photographed, and A represents a theoretical exposure value.

14. An electronic flash device comprising:

(a) an electronic flash emitting portion; and (b) an electronic flash circuit having an automatic emission control circuit for making the electronic flash emitting portion emit light, wherein the automatic emission control circuit stops emission of the electronic flash emitting portion when an amount of reflected light received by a light receiving element for receiving light reflected on a photographic object which has been emitted by the electronic flash emitting portion, reaches a specified value, and wherein with respect to the automatic emission control circuit, A min satisfies the following conditional expression, $$(A-1)EV \leq A\ min \leq (A+0.5)EV,$$

where A min represents a minimum exposure value for a recording medium on which a specified photographic object is recorded when the photographic object that is located at a distance falling within a range from a specified shortest distance to a distance determined by both a guide number obtained when the electronic flash emitting portion emits light at full emission and the aperture stop, is photographed, and A represents a theoretical exposure value.

15. An electronic flash device comprising:

(a) an electronic flash emitting portion; and (b) an electronic flash circuit having an automatic emission control circuit for making the electronic flash emitting portion emit light, wherein the automatic emission control circuit stops emission of the electronic flash emitting portion when an amount of reflected light received by a light receiving element for receiving light reflected on a photographic object which has been emitted by the electronic flash emitting portion, reaches a specified value, and wherein with respect to the automatic emission control circuit, A min and A max satisfy the following conditional expressions, $$(A-1)EV \leq A\ min \leq (A+0.5)EV,$$

and $$0.5\ EV \leq A\ max - A\ min,$$

where A min and A max are a minimum exposure value and a maximum exposure value, respectively for a recording medium on which a specified photographic object is recorded when the photographic object that is located at a distance falling within a range from a specified shortest distance to a distance determined by both a guide number when the electronic flash emitting portion emits light at full emission and the aperture stop, is photographed, and A represents a theoretical exposure value.

* * * * *